Figure 1:
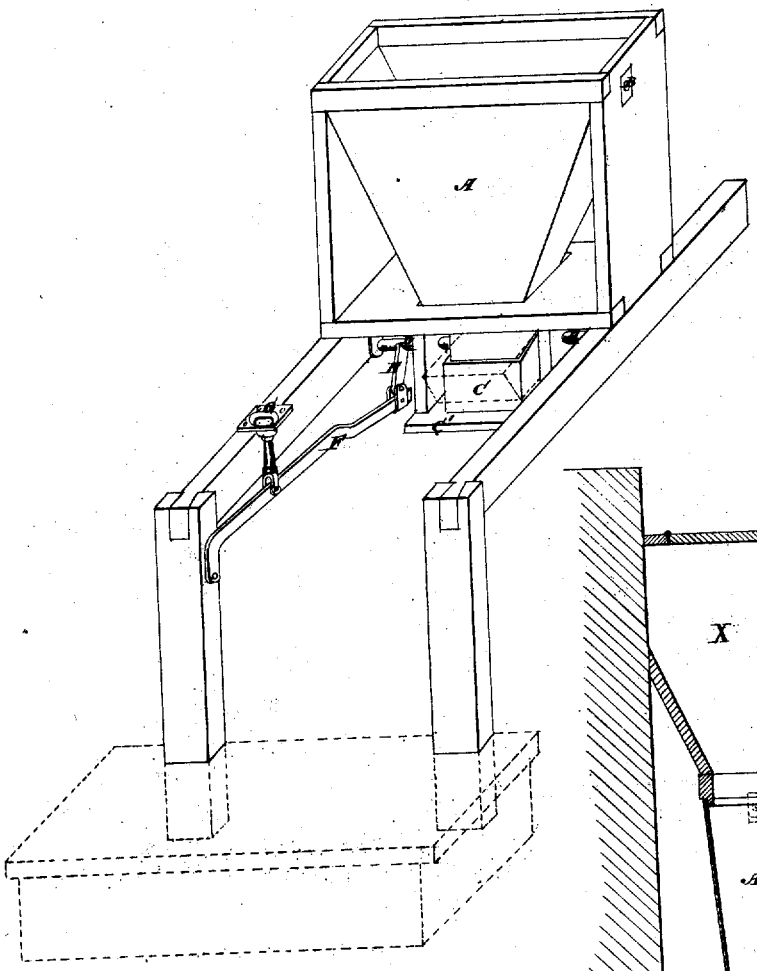

Moule & Girdleston,

Earth Closet.

No. 4137. Reissued Oct. 4. 1870.

Inventors.
Moule and Girdleston
By attorney
J. N. Mc. Intire

Witnesses.
C. E. Warren
E. S. McCully

N. PETERS, PHOTO-LITHOGRAPHER, WASHINGTON, D. C.

United States Patent Office.

EARTH-CLOSET COMPANY, OF HARTFORD, CONNECTICUT, ASSIGNEE OF HENRY MOULE AND HENRY JOHN GIRDLESTONE.

Letters Patent No. 91,474, dated June 15, 1869; reissue No. 4,137, dated October 4, 1870.

DIVISION A.

IMPROVEMENT IN DEODORIZING APPARATUS FOR CLOSETS.

The Schedule referred to in these Letters Patent and making part of the same.

*To all whom it may concern:*

Be it known that HENRY MOULE and HENRY JOHN GIRDLESTONE, of England, did invent certain new and useful Improvements in Earth-Closets, of which the following is a full, clear, and exact description, reference being had to the accompanying drawing making part of this application, and the letters of reference marked thereon.

This invention relates to improvements in apparatus to be used in closets and commodes, in which dry and powdered earths, (consisting of clay in a dry unburned state,) lime, peat, and other dry vegetable matters in powder, but more especially dry earths, are employed for deodorizing the fresh excrementitious matters, by covering or dusting them over with such powdered and dry earths, and has for its object to provide a simple, economic, and efficient means for effecting the distribution (from a reservoir or receptacle) of the deodorizing material upon the fresh excreta; and to these ends, This invention consists in the employment of an oscillatory or swinging distributer or "chucker," which is operated by suitable mechanism under the control of the person using the closet, and is adapted to receive a given supply or charge of the deodorizing material from the reservoir or deodorent receptacle, and scatter it over the deposit of excrementitious matter, as will be hereinafter more fully explained; and This invention further consists in the use of a vibratory or swinging hopper or case, adapted to hold a supply of the deodorizing material, and so arranged, in connection with the distributing mechanism that, each time the latter is operated, the said case or supply-hopper is slightly vibrated or shaken, to induce the contained material to descend and resupply the emptied chucker or other distributer, as will be hereinafter more fully explained; and This invention consists in the employment, in connection with a swinging-distributer or other device for receiving and emptying onto the excrement a charge of the deodorizing material, of a false bottom or platform, so arranged as to affect the retention of the charge of deodorizing material, and assist in spreading or scattering when the distributer is being emptied, as will be hereinafter more fully described.

To enable those skilled to make and use the several improvements made the subject of this application, they will now be more fully described by reference to the accompanying drawing, in which—

Figure 1 is a perspective view, and

Figure 2:
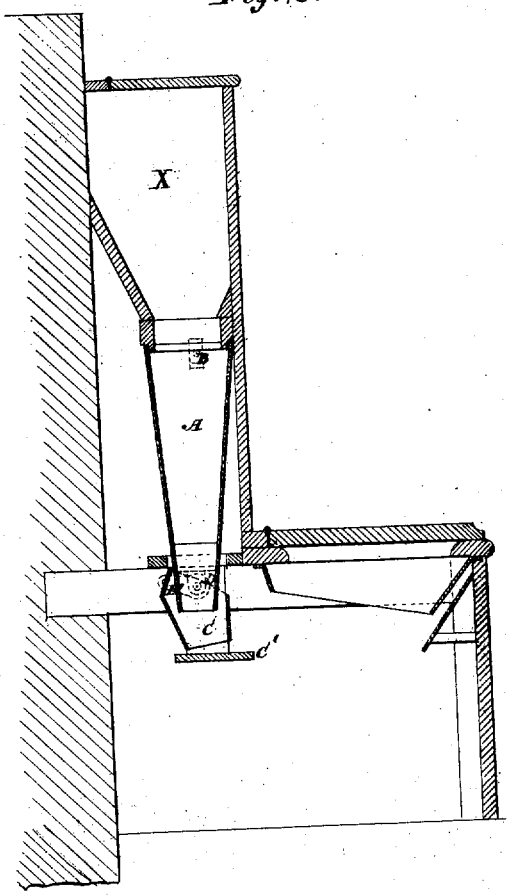

Figure 2, a transverse section of an earth-closet, in which said improvements are embodied.

A is a reservoir or hopper for holding the dry earth or other deodorizing material. This hopper A is hung on supporting-pivots B B at or near its upper part, and its lower end opens into what is termed a chucker, (or distributer,) C, for discharging the dry earth in sufficient quantities on the excrementitious deposit, in a suitable chamber below.

The hopper A is so disposed on its pivots, and arranged in connection with the chucker C, that it is vibrated in one direction by the movement of the latter, and in the other direction by its own gravity, each time the distributing mechanism is worked.

The chucker C, which is always charged with earth, is mounted on an axis, D, supported in suitable bearings at either end, as shown, and, immediately below its lower open end is arranged a stationary plate or platform, C′, which serves as a false bottom, to effect the retention of the contents of chucker C, when the latter is in its vertical normal position, and which is extended forward, as shown, so that, when the chucker is thrown up into a horizontal position, (as shown in dotted lines, fig. 1,) for the discharge of its contents, the said plate C will tend to more completely scatter the charge of material as it is thrown from the chucker.

The axis D is connected by an arm, E, fixed thereon to a bent lever, F, which is pivoted at one end to the casing of the closet, and has connected to it a pull handle, G, as clearly shown.

X is a box or reservoir for containing a supply of earth, and is arranged over and communicates with the upper end of the vibratory hopper A. When, however, a mere commode is made, this case X may be dispensed with, the hopper A being capable of containing a sufficient supply of the deodorizing material.

The parts alluded to are arranged in a suitable case, provided with a proper seat, as shown, and the operation is as follows:

The person using the closet, on rising from the seat, raises the pull-handle G, which, being connected, through the medium of lever F and arm E, with the axis D of the chucker C, causes the latter to be oscillated from its normal vertical position (seen at fig. 2) into a horizontal position, and its contents thrown out onto the deposit into the excrement-chamber.

As the chucker C is oscillated, as just explained, and emptied, its rear side is brought under and closes up the open lower end of the hopper A, while at the same time the upper edge of the front side of said chucker strikes against the hopper, and moves and vibrates its lower end backward.

When the pull-handle is released and descends, the lower end of hopper A swings forward again by gravity as the chucker assumes its normal vertical position over the false bottom C′, and is again filled.

It will be seen that, by means of the vibratory or moving hopper, the deodorizing material is shaken down all the time, and the filling of the chucker or distributer insured, and it will be understood that other means for producing the periodical vibration or shaking of the hopper than those shown may be employed, without departing from the spirit of this part of the invention; and it will also be understood that this part of the invention may be used with advantage in an earth-closet provided with some other kind of distributer from that herein described.

By means of the oscillating distributer or chucker C operating as described, the charge of earth, it will be seen, is thrown forward, and over the deposit, and the extended plate C′, it will be seen, acts on a sort of deflector or guide, to assist in the more advantageous distribution of the contents of the chucker, while at the same time it serves as a false bottom to the chucker; and it will be understood that both the chucker and the extended false bottom C′ may be separately used with advantage in earth-closets in which each of the other devices is different from those herein described.

What is claimed herein as new, and desired to be secured by Letters Patent, is—

1. A vibratory or movable hopper, constructed and operating substantially as and for the purposes described.

2. A swinging distributer or chucker, arranged to operate substantially in the manner and for the purposes set forth.

3. The deflector-plate C′, in combination with the chucker, operating as and for the purpose set forth.

In testimony whereof, we have hereunto set our hand and seal this 7th day of June, 1870.

EARTH-CLOSET CO.,
J. W. BEACH, *President.* [L. S.]

Witnesses:
C. J. BURNELL,
J. S. TRYON, Jr.